C. R. COCHRAN.
NUT LOCK.
APPLICATION FILED NOV. 29, 1919.

1,373,489.

Patented Apr. 5, 1921.

WITNESSES

INVENTOR
C. R. Cochran.
BY
ATTORNEYS

UNITED STATES PATENT OFFICE.

CHARLES ROYAL COCHRAN, OF VALE, OREGON.

NUT-LOCK.

1,373,489.  Specification of Letters Patent.  Patented Apr. 5, 1921.

Application filed November 29, 1919. Serial No. 341,364.

*To all whom it may concern:*

Be it known that I, CHARLES ROYAL COCHRAN, a citizen of the United States, and a resident of Vale, in the county of Malheur and State of Oregon, have invented certain new and useful Improvements in Nut-Locks, of which the following is a specification.

My invention is an improvement in nut locks, and has for its object to provide a lock of the character specified, which may be positively locked upon the bolt to prevent turning off of the lock, the lock being threaded to engage the bolt, and having teeth at a predetermined point on the inner surface thereof normally extending inwardly beyond the apex of the thread to positively engage the bolt, and adapted to be withdrawn beyond the apex of the thread, by bending that portion of the lock to which the teeth are connected, obliquely.

In the present embodiment of the invention, the improved lock, which in practice will be stamped from sheet steel or like suitable material, consists of a ring 1 having a central opening 2 for receiving the bolt 3. The lock is designed to be arranged at the outer face of the nut 4, in engagement with the threads of the bolt.

Figure 4:
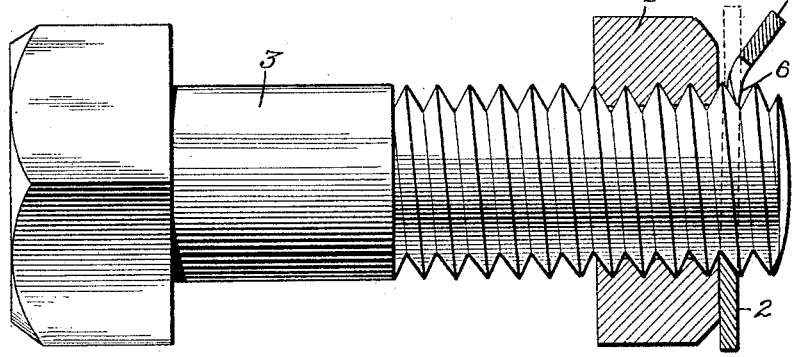
Fig. 4 is a sectional view showing the lock in place.

As shown, the lock which is a washer or ring has a thickness equal to one half the distance between two adjacent threads, this being clearly shown in Fig. 4. The inner surface of the ring, that is, the opening 2, is threaded as shown, and opposite the point indicated at 5 where the thread cuts across the plane of the washer, a series of teeth 6 is provided, two in the present instance.

These teeth are of such length that when the washer is flat, the teeth will extend within the clear opening through the ring or washer. That is, the teeth are of greater length than the depth of the thread of the washer.

The thread of the washer is so arranged that when the nut is in place on the threads of the bolt and adjacent to the face of the nut, the washer will hold an oblique position as shown in Fig. 4, contacting with the face of the nut at the side opposite the teeth, and being spaced slightly from the nut at the opposite side of the bolt.

It will be evident from the above, that the teeth 6 since they extend within the clear opening of the ring, that is, that portion of the opening within the thread, will prevent the turning of the washer on the bolt, when the washer is flat, since the clear opening for the bolt will be smaller than the diameter of the bolt at the bottom of the thread groove.

Figure 1:
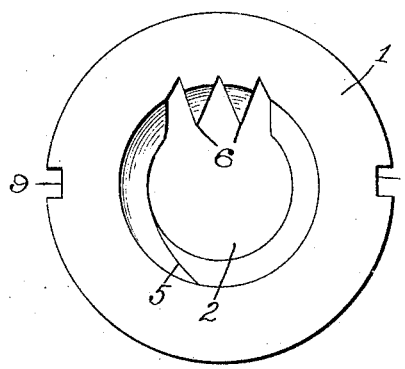
Figure 1 is a front view of the improved lock in locked position.
Figure 2:
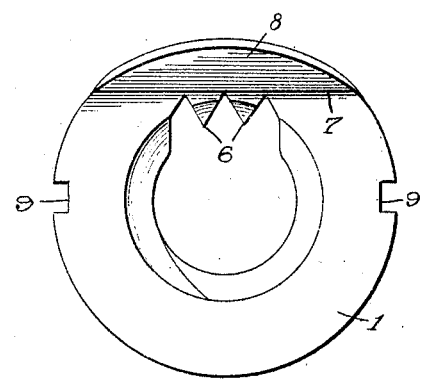
Fig. 2 is a similar view with the lock in unlocked position.
Figure 3:
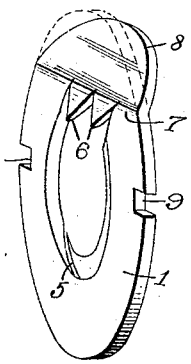
Fig. 3 is a perspective view.

In order to permit the turning of the washer on the bolt, the washer is bent as indicated in Fig. 2, on a line 7 which is at the base of the teeth 6, the portion 8 outside of this line 7 being bent at an obtuse angle to the body of the lock as shown in Fig. 4.

In order to lock the washer after it has been turned into place against the face of the nut, the bent portion of the lock is straightened as shown in dotted lines in Fig. 4 by means of a hammer or the like. Now the straightening of the bent portion forces the teeth into close and binding engagement with the wall of the thread groove, positively locking the lock in place and as a consequence, the nut.

In order to facilitate the turning of the nut, oppositely arranged notches 9 are provided in its peripheral edge, for engagement by a spanner to turn the lock, the points of the spanner being engaged within the notches. That part of the washer which contacts with the nut face, when the lock is turned into place, is directly opposite the teeth, and this occurs because of the arrangement of the thread, the thread crossing the plane of the nut at a point directly opposite the teeth.

In order to loosen the lock it is only necessary to insert a chisel or like tool between that portion 8 of the lock and the nut face, and bend the said portion outwardly to again withdraw the teeth from close contact with the bolt threads. The lock may now be turned off, and it will be evident that the lock may be reused as often as may be desired.

It will be evident that the improved lock may be arranged having left hand threads, merely by threading the washer in the proper manner.

It will be evident, from a consideration of the drawing, that the teeth will be moved into and out of engagement with the bolt threads, by the bending of the portion 8 of the lock. When this portion is bent in one direction, the teeth will bite into the walls of the grooves of the thread, while when it is bent in the opposite direction it will disengage the said walls.

I claim:

1. A nut lock comprising a ring or washer internally threaded to engage the bolt upon which the nut is to be locked, said lock having a thickness equal to half the thickness of the base of the thread of the bolt, and having inwardly extending teeth opposite the point where the thread of the lock makes a groove obliquely across the inner edge of the lock, said teeth being of greater height than the height of the thread, and being adapted to be withdrawn from the wall of the bolt threads or to be moved toward said threads by the bending laterally of that segment of the lock to whose base the bases of the teeth are attached, said lock having a segment thereof bent obliquely to the body, said segment having its base at the base of the teeth, and the lock having oppositely arranged notches for engagement by a tool to turn the same.

2. A nut lock comprising a ring or washer internally threaded to engage the bolt upon which the nut is to be locked, said lock having a thickness equal to half the thickness of the base of the thread of the bolt, and having inwardly extending teeth opposite the point where the thread of the lock makes a groove obliquely across the inner edge of the lock, said teeth being of greater height than the height of the thread, and being adapted to be moved into and out of engagement with the threads of the bolt by the bending laterally of that segment of the lock to whose base the bases of the teeth are attached, said lock having a segment thereof bent obliquely to the body, said segment having its base at the base of the teeth.

3. A nut lock comprising a ring or washer internally threaded to engage the bolt upon which the nut is to be locked, said lock having a thickness equal to half the thickness of the base of the thread of the bolt, and having inwardly extending teeth opposite the point where the thread of the lock makes a groove obliquely across the inner edge of the lock, said teeth being of greater height than the height of the thread, said lock having a segment thereof bent obliquely to the body, said segment having its base at the base of the teeth.

4. A nut lock internally threaded to engage a bolt and of a thickness corresponding to half the base of the thread of the bolt, said washer having inwardly extending teeth at the opposite side to the point where the thread cuts a groove from one side of the lock to the other, said teeth normally extending farther inward than the apex of the thread, and being adapted to be moved into and out of engagement with the bolt threads by the bending of that portion of the lock to which the bases of the teeth are connected, said lock having means for engagement by a tool to turn the same.

5. A nut lock internally threaded to engage a bolt and of a thickness corresponding to half the base of the thread of the bolt, said washer having inwardly extending teeth at the opposite side to the point where the thread cuts a groove from one side of the bolt to the other, said teeth normally extending farther inward than the apex of the thread, and being adapted to be moved into and out of engagement with the bolt threads by the bending of that portion of the lock to which the bases of the teeth are connected.

CHARLES ROYAL COCHRAN.